May 28, 1957 — S. HALPERN — 2,793,668

VEGETABLE TRIMMING BOARD

Filed July 15, 1953

INVENTOR.
SAM HALPERN
BY Roger C. Johnson
ATTORNEY (United States Patent Office)

2,793,668

VEGETABLE TRIMMING BOARD

Sam Halpern, Rock Island, Ill.

Application July 15, 1953, Serial No. 368,150

3 Claims. (Cl. 146—150)

The present invention relates generally to the art of cutting, slicing and trimming vegetables and the like, and is more particularly concerned with trimming boards especially adapted for use in operations of this kind.

The object and general nature of this invention is the provision of a vegetable trimming board especially constructed and arranged to facilitate the trimming of vegetables, as in large grocery stores, supermarkets and the like, where there are relatively large quantities of vegetables to be cut, trimmed and prepared for display and sale. For example, the trimming of such vegetables as celery, cauliflower, cabbage, sweet corn, rhubarb, and the like, for the purpose of removing dead, discolored and unwanted leaves and foliage is an arduous task where the quantity of vegetables to be processed runs to, say, thirty crates or more a day. It is the purpose of this invention to lighten this chore, lessen the time required and permit the operators to do a better and neater job. Thus, a better looking and more saleable article is produced.

The above and other objects and advantages of this invention will be apparent to those skilled in the art to which it appertains, after a consideration of the following description of the preferred embodiment, taken with the accompanying drawings, in which said embodiment has been illustrated by way of example.

Figure 1:
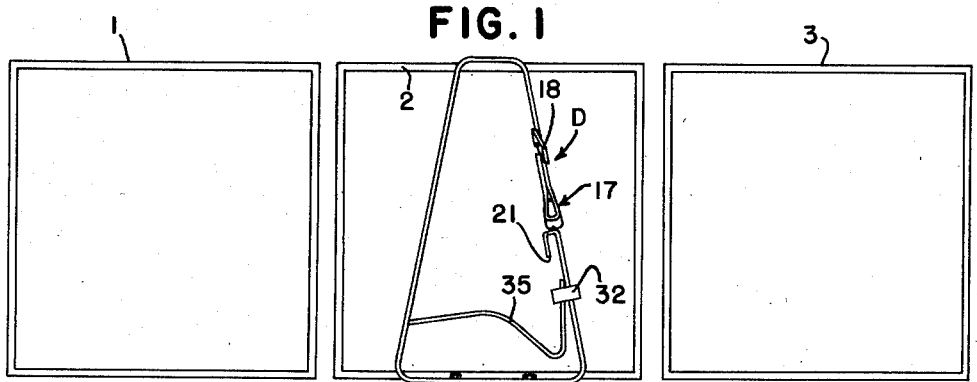
Figure 1 is a general plan view, showing a device incorporating the principles of this invention in use.

Referring first to Figure 1, which illustrates one way of using the device of the present invention, the vegetable crate shown at 1 contains the vegetables as they come from the supplier. The vegetable trimming board of the present invention, shown in its entirety at D, is placed on a second vegetable crate 2 that is adjacent a third crate 3, the latter receiving the cleaned and trimmed vegetables. The operator sits or stands at what may be termed a trimming station, represented by a chair 4. The device D sets across the top of the crate 2 and the trimmings and other discarded material drop down into the crate 2.

It will be understood that the above is only representative to illustrate one of several different ways the device may be used. For example, in some cases it may be desirable to place the device on a bench or table with crates 1 and 3 nearby and let the trimmings fall down through an opening in the bench or table. A crate or other suitable container may be placed underneath the opening to catch the debris.

Figure 2:
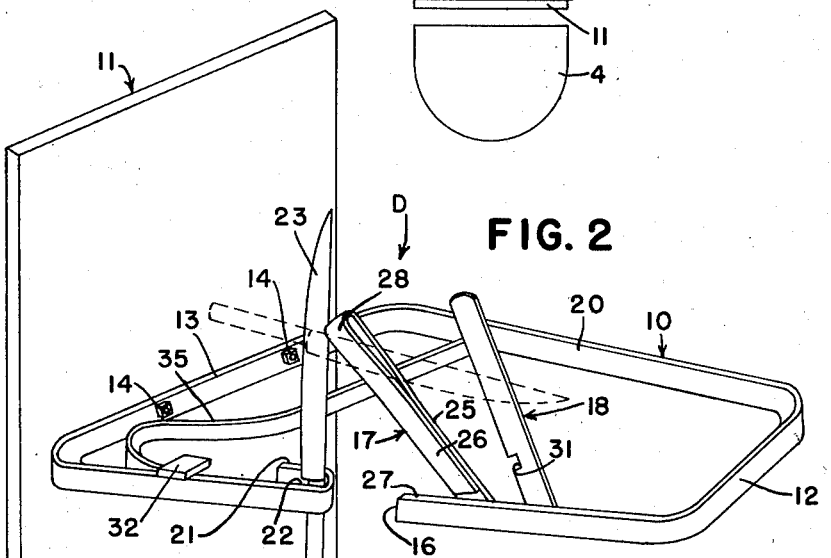
Figure 2 is an enlarged perspective view.
Figure 3:
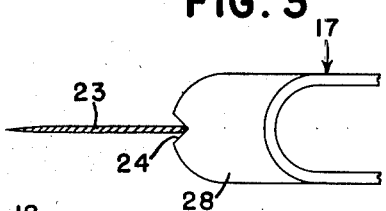
Figure 3 is a fragmentary detail view.
Figure 4:
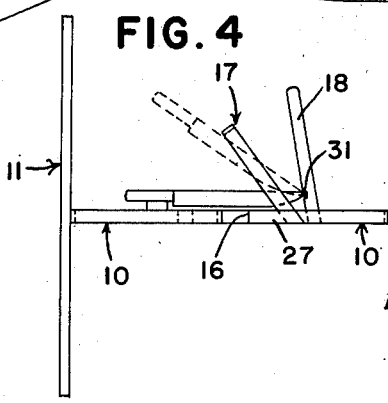
Figure 4 is a detail view showing the device as it is used when trimming sweet corn.

Referring now to Figures 2 et seq., the device D of the present invention comprises a base or platform 10 of openwork construction and a generally vertical backboard or upright 11, the latter extending both above and below the base 10. The base or platform 10 is preferably made of strap iron or the like and is of generally rectangular configuration, being slightly narrower at its outer end, as at 12, than at its other end 13. The section 13 is apertured to receive bolts 14 or any other suitable fastener by which the base 10 is fixed to the generally central portion of the upright 11. One side of the base or platform 10 is discontinuous, as at 16, and forwardly of the space 16 a pair of generally upwardly extending members 17 and 18 are fixed to base 10, as by welding or the like, the member 17 extending rearwardly and upwardly at a somewhat more acute angle than the angle at which the other member 18 extends, which is nearly vertical. This construction provides a pair of parts extending upwardly in diverging relation whereby any vegetables, particularly of an elongated shape, may be pushed into the space between the two parts 17 and 18 and thus wedgingly held therein while a trimming knife is passed downwardly on the inner side of the members 17 and 18 to cut off unwanted leaves and other portions. Celery and rhubarb are trimmed and topped in this way. The position of the trimming knife when used in this way is shown in dotted lines in Figure 2.

Rearwardly of the space 16, the bar 20 forming the base 10 is turned backwardly, as at 21, forming a socket or recess 22 that is adapted to resiliently receive and snugly hold the handle of the trimming knife with the blade 23 extending generally vertically and the upper portion seating in a notch 24 formed in the upper end of the guide 17. The blade of the knife in this position (full lines, Figure 2), faces the upright 11. The part 21 grips the knife handle with sufficient force to hold the knife rigid while the operator presses the vegetables thereagainst. For example, the butt ends of cauliflower and the butt ends of heads of lettuce and cabbage may be trimmed in this manner. Trimmings readily fall through the base 10 into the crate 2 or other suitable receptacle.

The member 17 is of special construction. It consists of a generally U-shaped part formed of resilient material with one leg 25 longer than the other leg 26. The leg 25 is rigidly secured, as by welding, to the frame bar forward of the space 16 a distance sufficient to leave a ledge or abutment 27 lying underneath the member 17. The part 17 is formed so that at the upper or bight portion, indicated at 28, the two parts 25 and 26 are spaced apart farther than points below the upper end 28, at which points the spacing is such that the blade of a knife is snugly received therebetween, but at the same time the knife is free to be moved up and down in the slot formed by the two parts or sections 25 and 26. At a point on its rear edge, the forward knife guide member 18 is provided with a notch 31 that is adapted to receive the point of the knife whereby when the operator bears down on the handle of the knife, the notch 31 serves as a fulcrum or pivot so that substantial leverage is obtained when cutting vegetables, such as corn, disposed between the knife guide 17 and the ledge or abutment 27. Rearwardly of the space 16 and the notch or recess 22, the base frame bar carries a stop 32. This stop, which may be made adjustable, is placed so as to be engaged by the handle of a knife, when the blade is disposed between the parts 25 and 26 and the point is disposed in the fulcrum notch 31, and the stop is arranged so that when it is engaged by a knife handle, the cutting edge of the knife blade lies a short distance above the abutment ledge 27. This has a special advantage when trimming corn. By placing the tip end of an ear of sweet corn, for example, on the ledge 27 and by using the knife as just described, namely, as a lever with the tip or point of the knife in the notch 31, the ends of all of the husks, except the last one, may be cut off, leaving the last husk uncut but lying between the blade of the knife, the latter being in its lowered position with the handle against the stop 32, and the ledge or abutment 27. Now by giving the ear of corn a quick flip upwardly, the knife blade momentarily retains the uncut husk and as the ear is drawn upwardly the uncut husk is stripped away from the ear exposing the kernels underneath. Thus, the corn is easily prepared so that the customers may readily see the kernels and so determine the condition of the corn without excessive handling.

When trimming cauliflower, for example, the same is placed against the upright board 11 and the point of the knife inserted between the leaves and center or flower cluster. Then by cutting outwardly and upwardly against the board the outer leaves are removed without damage to the center or edible portion of the cauliflower. Also, the board prevents the operator from soiling his clothes or injuring himself if the knife should slip. After the cauliflower leaves are removed, the knife is placed in an upright position, full lines, Figure 2, and the butt end of the cauliflower is cut off or trimmed by pushing the cauliflower against the knife, as described above for lettuce and cabbage.

The base or platform 10 also includes a curved brace 35 that reenforces the base and, in addition serves as a temporary support for the trimming knife, vegetables, and the like, but without interfering with the trimmings dropping down through the base into the crate 2 or other receptacle.

While I have shown and described above the presently preferred structure in which the principles of the present invention have been incorporated, it is to be understood that my invention is not to be limited to the particular details shown and described above, but that, in fact, widely different means may be employed in the practice of the broader aspects of my invention.

What I claim and desire to secure by Letters Patent is:

1. A vegetable trimming board comprising a base in the general form of an open rectangle having strap-like sides disposed generally vertical, an upstanding strap-like member fixed at its lower end and lying substantially in the plane of one of said sides, said member having a notch in one edge, the sides of said notch being open laterally, a knife guide also fixed at its lower end to said one strap-like side and including two adjacently disposed knife-embracing sections disposed generally in alignment with said member and the guide member thereto, thereby ensuring alignment, and a stop located on the strap-like side, whereby when the knife is moved between the guides and toward the stop, the guide prevents the point of the knife from becoming displaced laterally out of the fulcrum notch.

2. A vegetable trimming board comprising a base, said base having a strap-like side disposed with its edges generally vertical, said strap-like side extending generally in a first line, a generally vertical strap-like member fixed at its lower end to said strap-like side, a knife guide comprising a strap-like member bent backwardly onto itself to form two closely spaced sections, one slightly longer than the other, the longer section being fixed to said strap-like side adjacent and substantially in the same plane as said first strap-like member, the edge of the latter member having a point-receiving notch formed therein, said notch being formed in the edge adjacent said knife guide, the latter being resilient, whereby a vegetable trimming knife may be disposed between said guide sections and alongside one side of said generally vertical strap-like member or optionally disposed with its point in said notch, whereby the notch serves as a fulcrum, said guide sections serving, when the handle end of the knife is passed downwardly toward the strap-like side, to aid in retaining the knife point within said notch.

3. The invention set forth in claim 2, further characterized by said generally vertical strap-like member and said guide being fixed to said side so as to diverge upwardly.

References Cited in the file of this patent
UNITED STATES PATENTS

| | | |
|---|---|---|
| 1,007,593 | Moore | Oct. 31, 1911 |
| 1,177,804 | Richardson | Apr. 4, 1916 |
| 1,410,838 | Sales | Mar. 28, 1922 |
| 1,467,836 | Cabalka | Sept. 11, 1923 |
| 1,616,600 | Spies | Feb. 8, 1927 |
| 1,746,176 | Williams et al. | Feb. 4, 1930 |
| 2,159,945 | Wilson | May 23, 1939 |
| 2,179,897 | Oelkers | Nov. 14, 1939 |
| 2,322,905 | Tenbrook | June 29, 1943 |
| 2,407,658 | Fuchs et al. | Sept. 17, 1946 |
| 2,506,817 | Svec | May 9, 1950 |
| 2,613,714 | Miller | Oct. 14, 1952 |